United States Patent Office 2,700,604
Patented Jan. 25, 1955

2,700,604

STABILIZATION OF MIXTURES OF GRANULAR SOLIDS SUCH AS BORATES AND CHLORATES

Harold P. Knight, Pasadena, Calif., assignor, by mesne assignments, to Borax Consolidated, Limited, London, England, a corporation of Great Britain and Northern Ireland No Drawing. Application March 18, 1949, Serial No. 82,293

32 Claims. (Cl. 71—2.2)

This invention has to do with the treatment of mixtures of certain types of chemical substances of a generally granular nature to prevent segregation of the components of the mixture, thus maintaining a substantially uniform distribution of those components throughout the mixture.

Mixtures of solid particles of different types, especially when those types are characterized by different size distributions or different densities, have a tendency to become segregated, the more dense particles, for example, tending to become relatively more concentrated toward the bottom of the mixture and relatively less concentrated toward the top; or, if the substances are of equal densities, the relatively smaller and larger particles tend to concentrate in a manner which is dependent on the mixture proportions. The resulting variations in composition of the mixture are nearly always undesirable and may, in certain instances, be dangerous.

A primary object of the present invention is to prevent or greatly reduce the tendency toward segregation in mixtures of certain classes of substances, by causing the particles to coalesce into small aggregates, each of which typically contains all the components of the mixture in proportions similar to those of the entire mixture. Since the physical properties of all such aggregates in a given mixture are then substantially the same, segregation with respect to density or other characteristics is largely or wholly avoided. And if, under those circumstances, some segregation should occur, for example because of varying aggregate sizes, the invention has the further advantage that such segregation does not result in any appreciable irregularities in relative concentration of the components.

The invention is concerned more particularly with mixtures in which one component is a water soluble granular material capable in the solid state of at least two degrees of hydration (one of which may be anhydrous), and having a reasonably well defined (and otherwise suitable) temperature of transition from one condition of hydration to another; and a second component is a water soluble granular solid. A characteristic common to all such second components, so far as is known, is that their presence in solution lowers the transition temperature of the first component. It is possible that particular systems of the type defined may exist which do not exhibit that property, but the existence of such exceptional cases would not diminish the utility of the invention in the great majority of instances which show typical behavior. Additional components, comprising solid particles of similar or other types, may also be present in the mixtures. However, for the sake of clarity of description, and without intending any limitation of its scope, the invention will be discussed primarily with reference to only two components having the above defined properties.

In the present specification and claims the term "granular" is broadly used of any mass that consists of discrete particles, regardless of the shape or relative size of those particles.

The general method of the invention is to provide, either during or after thorough mixing of the components, liquid water in limited amounts at the points of contact between the particles of the various components of the mixture, so that at those points a solution is formed containing both adjacent components as solutes. The water is then removed, causing the dissolved solutes to resolidify, and forming a bridge or bond of solid material between neighboring particles. The degree of adhesion between the particles of the original mixture can be regulated within rather wide limits by suitable control of the amount of water that is thus provided, and of other conditions of the process. The resulting conglomeration of aggregated particles is preferably such that aggregates of suitable size are formed, or that the conglomerate mass can be broken apart readily into aggregates of suitable size; and yet that the bond between adjacent particles of the different components in the aggregates is sufficiently strong to prevent those aggregates from further breaking apart to any appreciable extent during normal handling or use of the mixture.

The preferred procedure of the invention for producing water in controlled quantity at the points of contact of the particles of the mixture is by heating the mixture to a predetermined temperature, at which water of hydration is released as a result of transition of the hydrated material from a relatively more hydrated to a relatively less hydrated state. The term "water of hydration" is used in the present specification and claims in the inclusive sense which does not exclude water of the types sometimes referred to as water of composition and water of crystallization. If the mixture reaches a temperature considerably higher than the normal transition temperature for that transition of the hydrated material, the amount of water released is in many instances so great as to dissolve a large proportion of the solids of the mixture. That is undesirable, since resolidification of the resulting slurry or solution generally results in a solid mass, which can be reduced to granular form only by vigorous crushing or grinding, the avoidance of which is one object of the invention.

That difficulty is avoided, according to a preferred form of the invention, by employing a maximum temperature which is only a little above the normal transition temperature of the hydrated salt, or which is below that transition temperature. Particularly in the latter instance, transition from the more hydrated to the less hydrated state of the hydrated component then does not take place generally throughout the body of the hydrated particles. However, at points in the neighborhood of contiguous particles of the other component of the mixture, the effective transition temperature is lowered. Under suitable conditions, the transition of the hydrated component to its less hydrated state takes place primarily locally, close to points of contact with particles of the second component, and water is therefore released preferentially at just those points at which it is needed.

Water provided in the manner just described forms a substantially saturated solution of both components of the mixture. After a sufficient quantity of such solution has been formed, the mixture is cooled to a temperature below the effective transition temperature. The resulting tendency of the originally hydrated component to return to its initial state of relatively greater hydration then causes the water to be taken up again as water of hydration. The solutes are progressively deposited in solid form, principally on adjoining surfaces of the component particles.

The material thus deposited forms a system of bridges between such particles, bonding them into typically dry aggregates which may include only two particles, or may be very large. The bond strength depends in general upon the amount of solute redeposited, and upon other factors such as the shapes of the various particles and the form of the deposit. The latter may in general comprise amorphous solids, mixed crystals, double crystals, etc., depending upon the nature of the materials used and upon the rate of cooling and other factors of the particular process.

If the amount of water reabsorbed by hydration upon cooling is less than was released upon heating of the mixture, the remainder can readily be removed by evaporation. The amount of water that must be evaporated under such conditions is ordinarily relatively small, and causes no difficulty, particularly since the wet material is already warm. Similarly, if the water released on heating to a convenient temperature is too little to provide the desired degree of coalescence of the particles, additional water can be added to provide a suitable total amount. In some instances satisfactory results can be obtained with added water only, without releasing water from the hydrated crystal by heating, the water then being finally removed entirely by evaporation. An example of a mixture with which evaporation is largely depended upon for removal of water is one comprising granular components which react chemically (whether at elevated or at normal temperature) with release of water. Such a chemical reaction may provide a convenient source of water for dissolving surface portions of the components, leading to the formation of solid connective structures between particles when the water is removed. However, since such chemical reactions are effectively irreversible the removal of the released water in such instances is ordinarily most conveniently accomplished by evaporation. For that reason the provision of water by chemical reaction, and involving no transition of a solid substance between different degrees of hydration, is similar in many respects to the direct addition of water. While that latter alternative has the advantage of being generally applicable with mixtures of any water soluble granular solids, regardless of whether they contain water of hydration, it is less desirable in a number of respects than the described preferred procedure.

The principal advantage of providing part or all of the required water by heat induced transition of a hydrated material is that such water is substantially wholly reabsorbed as the material cools, avoiding the expense and inconvenience involved in the evaporation of appreciable amounts of water. Furthermore, when the mixture is heated, as is preferred, to a temperature less than the normal transition temperature of the hydrated component, but greater than the effective transition temperature of that component in the presence of the other component of the mixture, the released water appears preferentially at the points of contact of unlike particles. The resulting favorable distribution of the released water permits the process to be carried out with a smaller total amount of water than when other methods of providing water are employed. Similarly, a smaller quantity of the soluble components is then dissolved, tending to retain the original generally granular structure of the entire mass. However, it should be noted that even when added water comprises most or all of the free water that is provided to the mixture, there is a strong tendency for such water to accumulate preferentially at points of contact of the particles at the acute angles that are formed by the particle surfaces at such contact areas.

Also, since water of hydration is released in uniform distribution throughout the mass of material, providing only that the components are initially well mixed and that the temperature is uniform, no stirring of the material is necessary (although it may be desirable) during processing beyond that which may be required to give even distribution of the heat. The amount of stirring required for that purpose depends largely upon the particular method of heating that is selected.

If heat is provided throughout the mixture, for example by the known techniques of high frequency electromagnetic radiation, substantially uniform temperature distribution may be maintained with a minimum of stirring. Application of heat by infra red radiation can be used advantageously in certain instances, particularly if the materials of the mixture permit relatively deep penetration of such radiation, with resultant distribution of heat energy throughout the mass. When the mixture is sufficiently porous, or is arranged in sufficiently thin layers, as on trays of wire mesh, for example, substantially uniform heating can ordinarily be obtained by circulation of heated air with little or no stirring. The humidity of the circulated air can be suitably controlled, by the use of steam jets and the like, to limit or to induce the evaporation of water from the mixture; or heated and substantially water-saturated air may be used to provide water to the mixture in controlled amount by condensation.

When heat is supplied to the mixture primarily from the walls of a heated container, considerable agitation is ordinarily required to produce uniformity of temperature distribution. Such agitation, at least during a part of the heating period, has the advantage of insuring at least momentary contact of every particle with particles of the other component, and thus giving an opportunity for adhesion of their wet surfaces. Consequently such agitation may be advantageous even where it is not necessary for heat distribution.

During the step of removing water, it may be advantageous not to disturb the mixture unnecessarily. If neighboring particles are allowed to retain stable relative positions during the formation of the solid bridges between them, a maximum strength of bond between particles is produced from a minimum amount of solution. On the other hand, under some conditions the bonds produced in that way may be stronger than is desired. It may then be more convenient, instead of reducing the amount of water that is provided, to maintain some stirring of the mixture as it cools, thereby weakening the bonds as they form and leading to a more readily frangible product or even to a product which requires no subsequent breaking up whatever.

A preferred manner of carrying out the drying step, when all water has been produced by the described process of releasing water of hydration by heat-induced transition, is to cool the damp material in a sealed vessel, preferably the same vessel in which it has been heated, while maintaining sufficient agitation to control the size of the final aggregates formed. The released water is then typically wholly reabsorbed by the material. That procedure yields directly a dry product comprising aggregates of particles of the desired size, no additional steps being ordinarily required.

With granular mixtures of certain substances there may be a slight tendency toward caking of the particles upon storage, even after the formation of particle aggregates in accordance with the invention. With such substances it may be desirable, even if cooling would reabsorb all of the released water, to remove a portion of the released water by evaporation. The amount of water, if any, which it is desirable to remove in that manner can readily be determined for each particular mixture.

An alternative example of a practicable manner of carrying out the step of removing water, particularly when some or all of the water is to be removed by evaporation, is to spread the wetted mixture out in relatively thin layers, as in trays. That permits rapid cooling without accompanying agitation, and any water not absorbed as water of hydration can readily be evaporated, for example by passing a current of dry air over the material. Such a procedure leads typically to a composition which contains small and relatively firmly bonded aggregates of particles which may be entirely unattached to each other, or (depending upon such factors as the thickness of the layer of material) may be joined together by relatively weak bonds to form sheets of agglomerated particles. Such sheets, when formed, are quite friable and are readily broken up into small aggregates of particles for convenient handling. Because of the friability of the material such a breaking step requires only relatively light machinery, and is quite distinct from the relatively difficult and expensive grinding or crushing of a solid mass of material.

The final particle aggregates of the processed mixture are preferably small enough for handling, weighing, measuring and the like by the methods normally applicable to granular materials. On the other hand the average aggregate size should be sufficiently large that the final product consists substantially wholly of aggregates which include portions of both components of the mixture, and that those components are preferably present in each aggregate in proportions which approximate those of the mixture as a whole. The average aggregates size which best meets these and other characteristics depends to some extent upon the nature of the components involved, but is ordinarily about two to about ten times the average size (on a volume or weight basis) of the original particles of the mixture. A size distribution within that general range can be obtained in most instances either directly from the drying step by suitable control of the amount of water provided and of the degree of agitation during the step of removing water, or by crushing the dry conglomerated but friable material between rollers whose separation is approximately twice the largest dimension commonly occurring among the original component particles.

Relatively small aggregates can be obtained directly in most instances by spreading out the wetted mixture relatively thinly on a suitable surface. That is particularly true if the particles of one component of the mixture are appreciably larger than those of the other component. Then the particles of the coarser component tend to become separated from each other when spread out thinly, while the relatively small particles of the other component tend to adhere to the said large particles by capillary action of the water solution. Such conditions are an example of those which lead typically to aggregates the majority of which comprise only one particle of the coarser component encrusted with a number of particles of the finer component.

Under certain conditions, particularly when one component is present in relatively small quantity and in the form of relatively fine particles, the process of the invention can be so controlled that substantially the whole of that finer component becomes dissolved during the wet stage of the process. Removal of the water then leads typically to particles of the coarser component (which may or may not themselves be bonded together) coated with a relatively thin layer of a solid mixture of the two components. That behavior, which in general results in particularly effective stabilization of the mixture, may result when either the fine or the coarse component is the hydrated material; but is more readily produced and controlled in the latter case. When the two components are present in comparable proportions it is usually preferable to limit the available water to an amount which can dissolve only a portion of both components.

Since an important object of the invention is to produce aggregates substantially all of which contain all components of the mixture, and preferably in proportions comparable to the overall proportions of the mixture, it is desirable during the formation of the aggregates that each particle, so far as possible, be in direct contact with particles of the other components. This can be facilitated by satisfying certain generalizations regarding the most desirable relative particles sizes of the respective components in mixtures which contain those components is specified relative proportions. For example, if components A and B are present in the proportions 5 to 1, and if all particles are the same size, it is unlikely that every particle of A will be in contact with a particle of B. That can be laid to the fact that the total available surface area of the B particles is relatively small. On the other hand, if the B particles are more finely divided than those of A, so that their total surface area is increased and made comparable to that of the A particles, the probability that all A particles are in contact with one or more B particles is greatly increased.

While no hard and fast rule can be given to cover all possibilities, it is advantageous in general if the total available surface areas of the particles of the several species are approximately equal, or at least comparable. That situation can be obtained in practice, for any predetermined proportions of the several components of the mixture, by providing each component in the form of particles having a definite size relation to the particles of the other components. If all particles are of the same general shape, that preferred size relation among the particles of the several components is such that the mean dimensions of the particles of the several components are at least roughly proportional to the relative amounts of the several components (on a volume basis) present in the mixture.

That relation will be understood by a consideration of a particular illustrative mixture having two components A and B, each made up of particles of uniform size, and all particles being of similar shape. If $M$ particles of component A are mixed with $N$ particles of component B, the relative particle sizes being $X$ and $Y$ respectively, the ratio of the total volumes of the two components is $$MX^3/NY^3$$

Taking, for purposes of illustration, the exact form of the preferred relationship stated above, the ratio of mean dimensions $X/Y$ is to be made equal to the ratio of volumes. Hence $$X/Y = MX^3/NY^3$$

or, $$MX^2/NY^2 = 1$$

The last equation shows that the available surface areas of the two components are equal, which is the desired relation. When the particles of each component are not all the same size, but have a reasonably well defined size distribution, the above relations hold approximately for the average particle dimensions. It is sufficient for all practical purposes that the above relationships hold only approximately.

An illustrative example of a mixture of the general type with which the present invention is particularly concerned is a mixture of granular sodium chlorate and crystals of a suitable borate. Such mixtures are of commercial importance for killing weeds. In that use, the chlorate provides a desirable rapid killing action, but if used by itself, whether in solution or as a granular solid, involves a serious fire risk when the chlorate becomes at least relatively dry and is in contact with organic matter. The addition of a borate, such, for example, as borax, in relative amounts of 2:1 or preferably 3:1, is known to substantially eliminate the risk of fire, and at the same time to extend the effectiveness of the mixture by the relatively slow but sustained weed-destroying property of the borate.

The primary remaining source of fire hazard in the use of such borate-chlorate mixtures lies in the possibility of systematic segregation of the components of the dry mixture, for example during shipping. The chlorate particles, having a density of about 2.49, tend to work downward through the borate particles, whose density is much less, being for instance 1.73 for borax. The ratio of borate to chlorate at the bottom of a large contatiner may thus be reduced from 3:1, which provides a safe dilution of the chlorate, to less than 2:1. At such lower ratios pregressively increasing fire hazard becomes possible. That is true, whether the mixture is scattered dry over the area to be treated, and is later dissolved either by rain or by artificially added water; or whether a solution is first made, and sprayed over the area. In either instance, dry vegetation treated with that portion of the mixture which has become enriched in chlorate may be rendered highly inflammable.

This difficulty is avoided in accordance with the invention by treating the mixture of borate and chlorate particles, before it is packaged, to stabilize the mixture against segregation. In the illustrative instance in which the borate component of the mixture comprises borax, stabilization is preferably accomplished by heating the mixture to a temperature at least as high as, and preferably somewhat higher than the transition temperature of borax in the presence of chlorate (which is about 38° C.); but less than, or only slightly higher than, the normal transition temperature of borax (about 60° C.) for the transition from borax ($Na_2B_4O_7 \cdot 10H_2O$) to the less hydrated tetraborate ($Na_2B_4O_7 \cdot 5H_2O$). At such a temperature water is primarily released by partial dehydration of the surface portions of borax crystals where these are in contact with chlorate particles (or, more precisely, where they are in contact with the resulting chlorate solution). As long as the temperature does not appreciably exceed the normal borax transition temperature, the dehydration does not take place generally throughout the borax particles, and the latter therefore tend to retain their identity.

The fact that the borax crystals become wet with a solution of chlorate and borate makes their surface sticky, so that chlorate particles tend to adhere to the wet borax surface. That produces the desired agglomeration of particles, and also promotes saturation of any released water with dissolved chlorate, thus maintaining the tendency toward dehydration of additional borax. The extent of that dehydration is subject to control by the temperature used, and also by limitation of the amount of heat that is supplied, particularly since heat is absorbed both in the transition of borax to the less hydrated tetraborate and in solution of sodium chlorate in the released water.

When the partial dehydration of the borax and the resulting agglomeration of the components of the mixture have progressed to the desired stage, which typically results in a moderately stiff damp granular mass and requires only a few minutes at a temperature, say, of 42° C., the mixture is cooled. As the temperature falls below the effective transition temperature for tetraborate in the presence of chlorate, undissolved $Na_2B_4O_7 \cdot 5H_2O$ tends to become rehydrated to borax, taking up water from the borate-chlorate solution. Dissolved borate is largely deposited in the form of borax, and dissolved chlorate is also recrystallized from solution. The solidification of those components "freezes" the adhering particles of chlorate and borax together by forming a bridging structure of solid material, typically forming a crusty but still friable mass. The original granular nature of the initial mixture persists to a greater or less degree after agglomeration of the granules, the original borax particles tending to maintain substantially their original identity. That facilitates the step of breaking up the crusty formation into aggregates of convenient size for handling. That step can typically be carried out by crushing after solidification is complete, or may result from suitably controlled agitation of the mixture as it is cooled and solidified.

Another suitable borate, which can be substituted for borax in the production of stabilized borate-chlorate mixtures, is sodium metaborate. That compound has a relatively more hydrated form ($NaBO_2 \cdot 4H_2O$) from which it normally changes to a less hydrated form ($NaBO_2 \cdot 2H_2O$) at a transition temperature of about 54° C. In the presence of sodium chlorate that transition temperature is reduced to approximately 43°. Hence, by heating a granular mixture of sodium metaborate and sodium chlorate to a temperature preferably between about 43° and about 54°, water is released by partial dehydration of the surface portions of the metaborate particles, and such heating therefore provides a convenient source of water for carrying out the stabilization of the mixture. Upon cooling, the released water is largely or wholly reabsorbed as water of hydration of the metaborate.

While it is ordinarily convenient with mixtures of chlorate and either metaborate or borax to produce, and frequently also to remove, substantially all of the required water by heating and cooling the mixture in the manner described, some or all of the free water can be provided alternatively by adding water to the mixture, such added water being ordinarily removed by evaporation. Alternatively, if the mixture initially includes a substance capable of hydration, water added to the mixture in any manner may be finally absorbed by hydration of that substance. That is true, for example, if the mixture contains partially or completely dehydrated borax or sodium metaborate (see below).

A modification of the above procedures, which is particularly useful when a less alkaline product is desired, also provides an example of stabilization of a mixture that includes three components. Instead of providing hydrated tetraborate (say) directly as decahydrate (borax), it may be initially provided in the form of a mixture of boric acid and partially dehydrated sodium tetraborate. As an illustration, equal parts by weight can be used of boric acid ($H_3BO_3$) and of calcined borax containing 3.2 mols of water ($Na_2B_4O_7 \cdot 3.2H_2O$), thus providing 6 mols of boric acid for every 1.43 mols of calcined borax. Those two components tend to react to produce sodium metaborate with the release of water in accordance with the equation $$Na_2B_4O_7 \cdot 3.2H_2O + 6H_3BO_3 \rightarrow 2NaB_5O_8 \cdot 5H_2O + 2.2H_2O$$

With the proportions stated, calcined borax is initially present in excess, and for every 2.2 mols of water released by the reaction there remain 0.43 mol unreacted tetraborate. That remaining tetraborate takes up the released water, becoming more hydrated, and yielding on the average (in the particular example here selected for illustration) $Na_2B_4O_7 \cdot 8.3H_2O$.

The result of the above reaction, which takes place as soon as the mixture is heated to a temperature above the reaction temperature (whether sodium chlorate is also present or not), is to produce a mixture containing 2 mols of $NaB_5O_8 \cdot 5H_2O$ and 0.43 mols of $Na_2B_4O_7 \cdot 8.3H_2O$ for every 1.43 mols of calcined borax present in the initial ingredients. Since the tetraborate in the reacted mixture is in a relatively more hydrated state (in the sense that it contains more than 5 mols of water), its excess water of hydration can be released by heating it above the normal transition temperature for transition to the pentahydrate; or, in the presence of other soluble substances, by heating it above the effective transition temperature for the particular mixture.

If sodium chlorate is added as a third ingredient to the above described mixture (either when the latter is in its initial form of calcined borax and boric acid, or after it has reacted partially or wholly to give the relatively more hydrated sodium tetraborate and sodium pentaborate) the process of the present invention can be carried out in its preferred form to yield a granular mixture stabilized against segregation. Thus, when such a mixture is heated to a temperature of say, 48° C., which is above the reaction temperature, the reaction indicated above, if not already carried out, goes substantially to completion, and the remaining sodium tetraborate is transformed to the pentahydrate, releasing $3.3H_2O$ per mol, or a total of 1.42 mols of water for every 1.43 mols of calcined borax in the initial mixture. The released water forms a solution at the points of contact of tetraborate-containing particles and the other components of the mixture, the solution probably in practice becoming saturated with all three components of the mixture, at least if stirring is continued. Any dissolved pentaborate gives up its water of hydration to the solution, increasing the amount of available water. In that way enough solution is produced to moisten the mixture, particularly at points of contact of chlorate and other particles.

The water is then removed, preferably by cooling the mixture below the effective transition temperature for transition of sodium tetraborate pentahydrate to a more hydrated form, so that the released water of hydration is again taken up. The solutes are thus resolidified, tending to form solid connecting portions between the undissolved particles of the mixture wherever those are in contact.

Using the named initial ingredients in the proportions stated, the total or average $B_2O_3$ to $Na_2O$ molar ratio in the borates of the final product is here approximately 4.1 to 1.

The process just described can be considered to be a modification of the procedure using a simple mixture of borax and chlorate, the primary difference being that the stabilizing process is carried out with the products of a chemical reaction rather than with the initially combined ingredients. It illustrates the fact that a third component may be included in the mixture without disturbing the process of the invention. Thus, for eaxmple, if pentaborate is added to a mixture of borax and chlorate (either by direct addition or by chemical reaction from partially dehydrated tetraborate and boric acid as described) the function of the pentaborate during the stabilizing process is substantially the same as that of the chlorate, except that some water is released as pentaborate goes into solution.

Boric acid can also be added to a mixture of fully hydrated borax and sodium chlorate, and the mixture stabilized in accordance with the invention. In that embodiment, however, whether or not the mixture is heated to release water from borax by transition to the pentahydrate, borax reacts chemically with boric acid to form sodium pentaborate and free water. The amount of water released by that chemical reaction is controllable, for example, by varying the proportions of borax and boric acid. The water thus released by chemical reaction adds to, and may even substantially take the place of water released by transition of borax to a state of lower hydration. However, when such a mixture is cooled, the water released by chemical reaction of borax and boric acid to sodium pentaborate is not again taken up, and must be removed in some other way, such as by evaporation. That portion of the free water, if any, that was produced by transition of borax to a less hydrated state is ordinarily reabsorbed (upon cooling) as water of hydration of borax, just as when no boric acid is initially present.

The described procedures for stabilizing mixtures which include boric acid and either borax or dehydrated borax illustrate how chemical reaction may be utilized in providing free water for the stabilizing process of the invention; and further illustrate the fact that such chemically released water may in some instances be finally absorbed as water of hydration, producing a dry stabilized granular product without the necessity of evaporating any water.

Another illustrative example of the utilization of a chemical reaction in carrying out the invention is afforded by mixtures which include boric acid in combination with sodium metaborate, stabilization being produced between those components and another granular water soluble substance such as sodium chlorate. If the metaborate in such a mixture is partially dehydrated, as $$NaBO_2 \cdot 2H_2O$$

and is present in sufficient quantity, the principal chemical reaction can then be represented as $$2NaBO_2 \cdot 2H_2O + 2H_3BO_3 \rightarrow Na_2B_4O_7 \cdot 7H_2O$$

If that reaction is carried out at room temperature, the resulting $Na_2B_4O_7 \cdot 7H_2O$ is stable, and no free water is released. However, upon heating the mixture above the transition temperature for borax in the presence of the other components of the mixture (ordinarily about 38° C.), 2 mols of water are released per mol of tetraborate formed by the reaction. Any tendency of that water to be taken up by transition of unreacted metaborate to the tetrahydrate can be avoided by raising the temperature above the effective transition temperature for that transition (ordinarily about 43° C.). The released water dissolves surface portions of the particles in the manner already described. Upon cooling, the water is reabsorbed by transition of the tetraborate and also of unreacted metaborate, if any, to more hydrated form.

If fully hydrated sodium metaborate is used in a mixture of the general type just described, the principal reaction is $$2NaBO_2 \cdot 4H_2O + 2H_3BO_3 \rightarrow Na_2B_4O_7 \cdot 10H_2O + H_2O$$

Hence a little water is released, even at room temperature, and by suitably heating the mixture additional water can be made available by transition of the borax. The latter water is in general reabsorbed by the borax on cooling, but the water released directly by the chemical reaction must be removed by other means, such as evaporation.

In stabilizing mixtures of borate and chlorate in the general manner described, it has been found desirable to add to the granular mixture before or during treatment a small quantity of a wetting agent. The addition of roughly a tenth of one per cent of alkyl aryl sulfonate, for example, to a 2:1 mixture of borax and sodium chlorate appears to be helpful, particularly in leading to a final stabilized granular product which can be stored with little or no tendency to become caked. Such addition of a detergent is particularly advantageous when all of the free water employed in the stabilizing process is removed by absorption in the mixture.

As a further description and illustration of the invention, but without intending any limitation upon its scope, certain other systems to which the preferred form of the invention has been found to be conveniently applicable are listed in the table. The hydrated component is given in the table together with the nature of the transition, it being understood that the transition results also in the formation of a solution. For convenience of reference the two principal borate-chlorate systems already described are included in the table. The data given are for mixtures of the first and second components in the ratio, by weight, of 2:1. Temperatures are centigrade. In each instance the mixture was heated to a temperature between that mentioned in the right hand column and the normal temperature of transition of the hydrated component; and then was cooled below the former temperature (substantially to room temperature). In every case the mixture became moist upon heating and that moisture disappeared rapidly upon cooling, yielding a dry and satisfactorily stabilized product.

of the present process, its water of hydration is released only to the extent that the barium chloride goes into solution, and is reabsorbed when the barium chloride is recrystallized upon cooling of the mixture. In spite of such exceptional instances in which both components may be hydrated, no confusion should be caused by reference in the present discussion or claims to "the non-hydrated component," that phrase referring to the component not subject to transition from one degree of hydration to another. In Example 7, there is a relatively slight depression of the normal transition temperature of the calcium nitrate because boric acid is only moderately soluble and perhaps also because the two states of hydration differ by only one mol of water. However, even in that instance the preferred procedure of the invention leads to a dry stabilized product.

As already explained in connection with illustrative systems including boric acid, when two components of the mixture are such that the hydrated component is chemically transformed (for example, upon heating) into one or more substances which are not hydrated, or which can absorb less water of hydration than is equivalent to that of the original material, not all of the water released upon heating the mixture is taken up after cooling, requiring removal of the remaining water by other means. However, the theoretical possibility of such chemical reaction does not necessarily imply that the preferred steps of heating and then cooling the mixture will not lead directly to a dry stabilized mixture. Thus, in Examples 3, 4, 6 and 7 the two components have no common ion, so that metathesis can take place, and yet in practice those mixtures rapidly become dry upon cooling in the manner already described.

I claim:

1. The method of treating a mixture of a plurality of solid granular components to reduce segregation of the components, the mixture including a first component which is a water soluble solid in a state of relatively great hydration, which state is stable at temperatures below a normal transition temperature, the said solid being capable of an alternative state of relatively less hydration which is stable at temperatures above that transition temperature, and a second component which is a water soluble solid having the property that its presence in aqueous solution lowers the said transition temperature of the first component; said method comprising the steps of heating the mixture to a temperature approximately within the range between the effective transition temperature of the first component when in the presence of a saturated solution of the second component and the normal transition temperature of the first component, whereby water of hydration is released by transition of a portion of the first component from its relatively more hydrated state to its relatively less hydrated state, and then cooling the mixture to a temperature below the said effective transition temperature, whereby released water is reabsorbed by the first component as water of hydration.

2. The method defined in claim 1 and in which the mixture is agitated during at least a portion of the water releasing step and is substantially free of agitation during at least a portion of the water absorbing step.

3. The method defined in claim 1 and including the step of removing a portion of the released water by evaporation during the said cooling step.

4. The method of treating a mixture of a plurality of solid granular components to reduce segregation of the components, the mixture including a first component

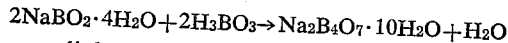

Table

| Example | First Component and Nature of Transition | Normal Temp. of Transition | Second Component | Lowest Temp. of Observed Stabilization |
|---|---|---|---|---|
| | | Degrees | | Degrees |
| 1 | $Na_2B_4O_7 \cdot 10H_2O \rightarrow Na_2B_4O_7 \cdot 5H_2O + 5H_2O$ | 60 | $NaClO_3$ | 38 |
| 2 | $NaBO_2 \cdot 4H_2O \rightarrow NaBO_2 \cdot 2H_2O + 2H_2O$ | 54 | $NaClO_3$ | 43 |
| 3 | $Na_2B_4O_7 \cdot 10H_2O \rightarrow Na_2B_4O_7 \cdot 5H_2O + 5H_2O$ | 60 | $K_2SO_4$ | 53 |
| 4 | $Na_2B_4O_7 \cdot 10H_2O \rightarrow Na_2B_4O_7 \cdot 5H_2O + 5H_2O$ | 60 | $C_6H_8(OH)_6$ Mannite | 50 |
| 5 | $Ba(OH)_2 \cdot 8H_2O \rightarrow Ba(OH)_2 \cdot 4H_2O + 4H_2O$ | 78 | $BaCl_2 \cdot 2H_2O$ | 74 |
| 6 | $CH_3COONa \cdot 3H_2O \rightarrow CH_3COONa + 3H_2O$ | 58 | $KNO_3$ | 49 |
| 7 | $Ca(NO_3)_2 \cdot 4H_2O \rightarrow Ca(NO_3)_2 \cdot 3H_2O + H_2O$ | 42.5 | $H_3BO_3$ | 41 |

The following points regarding the examples in the table indicate the broad applicability of the method. The method is not confined to salts, Example 5 illustrating the use of a hydroxide as first component and Examples 4 and 7 illustrating the use of an alcohol and an acid, respectively, as second component. Organic compounds are involved in Examples 4 and 6. In Example 6 the less hydrated form of the hydrated salt is anhydrous. In Example 5 both components are hydrated, but since $BaCl_2 \cdot 2H_2O$ does not undergo transition to the solid anhydrous form under the conditions which is a water soluble solid in a state of relatively great hydration, which state is stable in the presence of the other components of the mixture at a temperature below an effective transition temperature, the first said component being capable of an alternative state of relatively less hydration which is stable at temperatures above that effective transition temperature in the presence of the other components of the mixture, and a second component which is a water soluble solid; said method comprising heating the mixture to a temperature above the said effective transition temperature, whereby water of hydration is released by transition of at least a portion of the first component from its relatively more hydrated state to its relatively less hydrated state, and whereby portions at least of the two components are dissolved, and then cooling the mixture to a temperature below and the said effective transition temperature, whereby released water is reabsorbed as water of hydration of the first component and the dissolved solutes precipitated.

5. The method defined in claim 4 and also comprising supply water to the mixture in addition to the released water of hydration for forming solution of the components in addition to that formed in the released water of hydration, and removing by evaporation the excess of water over that which is reabsorbed as water of hydration by the first component.

6. The method defined in claim 4 and in which the said first component is a substance selected from the group consisting of sodium tetraborate and sodium metaborate.

7. The method defined in claim 4 and in which the said first component is barium hydroxide.

8. The method defined in claim 4 and in which the said first component is sodium acetate.

9. The method defined in claim 4 and in which the said first component is calcium nitrate.

10. The method of treating a mixture of a plurality of solid granular components to reduce segregation of the components, the mixture including a first component which is a water soluble solid in a state of relatively great hydration, which state is stable at temperatures below a normal transition temperature, the said solid being capable of an alternative state of relatively less hydration which is stable at temperatures above that transition temperature, and a second component which is a water soluble solid having the property that its presence in aqueous solution lowers the said transition temperature of the first component; said method comprising the steps of heating the mixture to a temperature approximately within the range between the effective transition temperature of the first component when in the presence of a saturated solution of the second component and the normal transition temperature of the first component and thereby providing free water predominantly at points of contact between particles of the respective components of the mixture by transition of localized portions of the first component from its relatively more hydrated state to its relatively less hydrated state, and then cooling the mixture to a temperature below the said effective transition temperature and removing the free water to form bonds of solid material between particles of the mixture.

11. The method of treating a mixture of a plurality of solid granular components to reduce segregation of the components, the mixture comprising first and second components which are water soluble solids; said method comprising incorporating in the said mixture a third component which is a solid granular material capable of reacting chemically with the first component with release of water, the first component being present in excess with respect to the said reaction, heating the mixture to a temperature at which the said water releasing reaction goes substantially to completion, agitating the wet mixture, whereby free water is provided at points of contact of the first and second components of the mixture by chemical reaction of the first and third components, and then cooling the mixture and removing the free water to form bonds of solid material between particles of the mixture.

12. The method of treating a mixture of a plurality of solid granular components to reduce segregation of the components, the mixture including a first component which is a water soluble solid capable, when below a definite effective temperature of transition in the presence of the other components of the mixture, of absorbing water as water of hydration, a second component which is a water soluble solid capable of reacting chemically with the first component with release of water, the first component being present in the mixture in excess with respect to the said reaction, and a third component which is a water soluble solid; said method comprising heating the mixture to a temperature above the said transition temperature, whereby chemical reaction of the first and second components releases free water that remains free in the presence of the unreacted portion of the first component, and then cooling the mixture to a temperature below the said transition temperature, thereby absorbing released water as water of hydration of the unreacted portion of the first component.

13. The method of treating a mixture containing granular sodium chlorate, granular boric acid and partially dehydrated granular sodium tetraborate to reduce segregation of the said components of the mixture; said method comprising heating the mixture to a temperature between about 38° C. and about 60° C., thereby releasing water by virtue of the chemical reaction of sodium tetraborate and boric acid, and then cooling the mixture to a temperature below about 38° C., thereby absorbing released water as water of hydration of unreacted sodium tetraborate.

14. The method of treating a mixture containing granular borax and granular sodium chlorate to reduce segregration of the said components of the mixture; said method comprising the steps of heating the mixture to a temperature between about 38° C. and about 60° C., thereby releasing water of hydration of the borax at points of contact between borax and chlorate particles, and then cooling the mixture to a temperature below about 38° C., thereby reabsorbing released water as water of hydration.

15. The method of treating a mixture containing granular sodium metaborate and granular sodium chlorate to reduce segregation of the said components of the mixture; said method comprising the steps of heating the mixture to a temperature between about 43° C. and about 54° C., thereby releasing water of hydration of the metaborate at points of contact between metaborate and chlorate particles, and then cooling the mixture to a temperature below about 43° C., thereby reabsorbing released water as water of hydration.

16. The method of treating a mixture of a plurality of solid granular components to reduce segregation of the components, the mixture including a first component which is a water soluble solid having a state of relatively great hydration, which state is stable in the presence of the other components of the mixture at a temperature below an effective transition temperature, the said first component being capable of an alternative state of relatively less hydration which is stable at temperatures above said effective transition temperature in the presence of the other components of the mixture, and a second component which is a water soluble solid; said method comprising incorporating in the mixture a reagent which is capable of reacting chemically with the first component to produce a water soluble solid third component with release of water, said first component being present in excess with respect to the said reaction, causing said reaction at a temperature below said transition temperature and thereby providing water of hydration to any of the excess of the first component which may have been initially in its state of lesser hydration, heating the mixture to a temperature above the said effective transition temperature, whereby water of hydration is released by transition of at least a portion of the excess first component from its more hydrated to its less hydrated state, whereby portions at least of the three components are dissolved, and then cooling the mixture to a temperature below the said effective transition temperature, whereby released water is reabsorbed as water of hydration of the first component and the dissolved solutes precipitated.

17. The method of producing a homogeneous, dry, granular, crystalline vegetation controlling composition containing sodium borates and sodium chlorate, in which the molar ratio of $B_2O_3$ to $Na_2O$ of the borates is greater than 2:1; said method comprising providing an initial mixture of granular hydrated sodium tetraborate and crystalline sodium chlorate, adding to such mixture an amount of boric acid which will react with less than the total amount of tetraborate to produce sodium pentaborate and release water in the mixture and thus provide water of hydration for any of the unreacted tetraborate which may initially be in its state of lesser hydration, causing said reaction, heating the mixture to a temperature above the effective hydration transition temperature of the tetraborate in the presence of the other constituents of the mixture and thereby causing release into the mixture of water of hydration from the tetraborate, whereby at least portions of the tetraborate, pentaborate and chlorate are dissolved, removing by evaporation any water in excess of that which is reabsorbable as water of hydration by the tetraborate and cooling the mixture to a temperature below said effective transition temperature whereby released water is reabsorbed as water of hydration of the tetraborate and the dissolved solutes co-precipitated in crystalline form.

18. The method defined in claim 17, and in which the relative amounts of tetraborate and boric acid are such as to produce final sodium borates having an average ratio of $B_2O_3$ to $Na_2O$ of about 4:1.

19. The method defined in claim 17, and in which the initial tetraborate is in its greater state of hydration.

20. The method defined in claim 17, and in which the initial tetraborate is in its lesser state of hydration.

21. A dry, granular, crystalline composition for control of vegetation consisting essentially of sodium chlorate and sodium borate, containing the chlorate in an effective vegetation controlling concentration and the borate in an amount sufficient to overcome the flammability of the chlorate; each discrete granule being composed of crystalline borate and crystalline chlorate in substantially the proportions of the composition and at least a portion of each of the crystalline borate and crystalline chlorate in each granule having been co-crystallized from a common solution.

22. The composition defined in claim 21 and in which the ratio of borate to chlorate is between about 2:1 and 3:1, and in which the molar ratio of $B_2O_3$ to $NaO_2$ in the borate is about 4:1.

23. The method of treating a mixture of a plurality of solid granular crystalline components to reduce segregation of the components, the mixture including a first component which is a water soluble solid which has a state of hydration that is stable in the presence of the other components of the mixture below an effective transition temperature, and a second component which is a water soluble solid; said method comprising heating the mixture to a temperature above the said effective transition temperature, whereby water of hydration is released from at least a portion of the first component, and whereby portions at least of both components are dissolved, and then cooling the mixture to a temperature below the said effective transition temperature, whereby released water is reabsorbed as water of hydration of the first component and the dissolved solutes precipitated by co-crystallization from a common solution.

24. The method defined in claim 23 and in which the first component is a hydrated borate and the second component is sodium chlorate.

25. A dry, granular, crystalline composition for control of vegetation consisting essentially of sodium chlorate and sodium borate, containing the chlorate in an effective vegetation controlling concentration and the borate in an amount sufficient to overcome the flammability of the chlorate; substantially all of the chlorate being physically bound to borate in discrete granules having substantially the proportions of the composition, and at least a portion of each said granule consisting essentially of borate and chlorate co-crystallized from a common solution.

26. A dry granular composition of matter consisting of sodium chlorate and hydrated sodium borate, substantially all of the sodium chlorate being bonded in particles of the said composition which also contain an appreciable proportion of hydrated sodium borate.

27. A dry composition of matter composed of discrete solid particles, substantially all of which particles include portions consisting of hydrated sodium borate, other portions consisting of sodium chlorate, and portions physically bonding the first mentioned two portions and comprising solid co-precipitated sodium borate and sodium chlorate.

28. A dry granular composition of matter consisting essentially of sodium chlorate and sodium borate; substantially all the discrete granules of the composition including both chlorate and borate, at least a portion of each of the chlorate and borate of the said granules having been co-precipitated from a common solution.

29. The composition defined in claim 28 and in which the molar ratio $B_2O_3/Na_2O$ is approximately 4.

30. The method of treating a mixture of a plurality of water soluble granular components to reduce segregation of the components, one of the said components having the property of absorbing water as water of dry crystallization when below an effective transition temperature in the presence of the remainder of the mixture; said method comprising the steps of heating the mixture to a working temperature above the said transition temperature, providing and mixing free water in the mixture at the said working temperature in an amount not greater than will be absorbed by the said one component upon cooling to a temperature below the said transition temperature, whereby portions at least of each component are dissolved, then cooling the resulting composition to a temperature below the said transition temperature, thereby causing substantially all of the free water to be absorbed as water of crystallization of the said one component and co-precipitating the solutes to produce a substantially dry mixture in which the components are physically bonded together.

31. The method defined in claim 30 and in which the said components include sodium chlorate and a hydrated sodium borate.

32. The method defined in claim 30 and in which the said one component is a substance selected from the group consisting of sodium tetraborate and sodium metaborate.

References Cited in the file of this patent

UNITED STATES PATENTS

| | | |
|---|---|---|
| 1,854,405 | Heath | Apr. 16, 1932 |
| 1,914,969 | Chipman | June 20, 1933 |
| 2,244,158 | Hubbard | June 3, 1941 |
| 2,414,969 | Moose | Jan. 28, 1947 |

FOREIGN PATENTS

| | | |
|---|---|---|
| 101,089 | Australia | May 27, 1937 |

OTHER REFERENCES

Chemical Industries, March 1941, pages 324 and 325.